US011937755B2

(12) United States Patent
Wiles

(10) Patent No.: US 11,937,755 B2
(45) Date of Patent: Mar. 26, 2024

(54) DISHWASHING APPLIANCE HAVING A DOOR LINKAGE ASSEMBLY

(71) Applicant: Haier US Appliance Solutions, Inc., Wilmington, DE (US)

(72) Inventor: Zachary Wiles, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 12 days.

(21) Appl. No.: 17/673,177

(22) Filed: Feb. 16, 2022

(65) Prior Publication Data

US 2023/0255440 A1 Aug. 17, 2023

(51) Int. Cl.
*A47L 15/42* (2006.01)
*E05F 5/08* (2006.01)

(52) U.S. Cl.
CPC ............ *A47L 15/4261* (2013.01); *E05F 5/08* (2013.01); *E05Y 2900/304* (2013.01)

(58) Field of Classification Search
CPC ... A47L 15/4261; E05F 5/08; E05Y 2900/304
See application file for complete search history.

(56) References Cited

U.S. PATENT DOCUMENTS 7,934,783 B2 * 5/2011 Van Vooren ........ A47L 15/4261 312/328
8,882,933 B2 11/2014 Assmann et al.
8,944,530 B2 2/2015 Haft et al.
9,155,444 B2 10/2015 Lee
9,642,511 B2 5/2017 Shoup et al.
10,111,575 B2 10/2018 Torrentes et al.
10,231,595 B2 * 3/2019 Ryan ................... A47L 15/4261
2006/0090686 A1 * 5/2006 Thompson .............. B63B 17/02 114/361
2008/0122331 A1 * 5/2008 Haeberle ............. A47L 15/4261 312/319.1
2008/0272678 A1 * 11/2008 Tynes .................. A47L 15/4261 49/506
2008/0307746 A1 * 12/2008 Lewis ..................... B64C 1/066 52/745.05
2014/0375192 A1 * 12/2014 Haft .................... E05D 13/1207 49/386
2021/0131161 A1 5/2021 Contreras et al.
2022/0361727 A1 * 11/2022 Ryan ................... A47L 15/4251

* cited by examiner

*Primary Examiner* — James O Hansen
(74) *Attorney, Agent, or Firm* — Dority & Manning, P.A.

(57) ABSTRACT

A dishwashing appliance may include a cabinet, a tub, a door, a hinge, a spring linkage, and a clevis. The hinge may define a top edge, a bottom edge, and an arched cutout extending upward from the bottom edge. The arched cutout may have an entrance defined at the bottom edge, an apex disposed above the entrance, and an arcuate seat disposed below the apex. The spring linkage may extend from a first end to a second end. The first end may be mounted to the cabinet. The clevis may be disposed at the second end of the spring linkage in selective attachment with the hinge. The clevis may include a rigid leg and a connecting pin extending laterally from the rigid leg. The connecting pin may be received within the arcuate seat. The rigid leg may extend upward above the apex to cover the apex.

20 Claims, 10 Drawing Sheets

DISHWASHING APPLIANCE HAVING A DOOR LINKAGE ASSEMBLY

FIELD OF THE INVENTION

The present subject matter relates generally to appliances, and more particularly to dishwashing appliances having a linkage assembly for in-situ removal of a door from an installed dishwashing appliance.

BACKGROUND OF THE INVENTION

Dishwasher appliances generally include a tub that defines a wash chamber for receipt of articles for washing. A door provides for selective access to the wash chamber. For example, the door can be rotatably mounted to the wash tub with a hinge. The door can selectively adjust between an open and a closed position by rotating about the hinge in order to permit access to the wash chamber.

Typically, removal of a dishwasher door requires the hinge arms to disconnect from the door while the hinges stay connected to the tub and spring system. In order to maintain proper door stiffness in relation to the hinge arms, the hinge arms must stay connected to the door during removal of the door. This requires removal of the entire dishwasher from the cabinet in order to access the spring linkage and remove the door. Removal of the entire dishwasher from the cabinet is undesirable because of, for example, the additional labor involved with removing and reinstalling the appliance in the cabinet and accidental damage to cabinets and floors. Moreover, removing the door may require angling the door, which may add potential energy to door balance system. This increase in potential energy may create a safety risk and increase the difficulty for door removal. Past attempts to solve such problems or otherwise provide a linkage system to counterbalance the door have been unsatisfactory. In particular, past systems could become misaligned (e.g., at the connection point between the linkage system and the door or hinge), interfering with rotation of the door. For instance, audible clicks or noises were often created by the misaligned contact between a door hook and a door hinge. Additionally or alternatively, misalignment between a door hook and a door hinge may prevent the door from staying open (e.g., bias the door to a closed position).

Accordingly, a need arises for an appliance that allows for easy removal of the door. It may also be advantageous to provide dishwashing appliances that allow for removal of the dishwasher door without requiring removal of the dishwasher from the cabinet. Moreover, it may be especially advantageous to provide a dishwashing appliance wherein interference or misalignment between the linkage assembly and the door was prevented.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a dishwashing appliance is provided. The dishwashing appliance may include a cabinet, a tub, a door, a hinge, a spring linkage, and a clevis. The cabinet may define a wash chamber for the receipt of articles for washing. The cabinet may include a pair of opposing sidewalls, a top wall, and a rear wall. The tub may be disposed inside the cabinet and define a front opening. The door may be rotatably positioned at the front opening and provide selective access to the wash chamber of the cabinet. The hinge may be rotationally fixed to the door. The hinge may define a top edge, a bottom edge, and an arched cutout extending upward from the bottom edge. The arched cutout may have an entrance defined at the bottom edge, an apex disposed above the entrance relative to a vertical direction, and an arcuate seat disposed below the apex relative to the vertical direction. The spring linkage may extend from a first end to a second end. The first end may be mounted to the cabinet. The clevis may be disposed at the second end of the spring linkage in selective attachment with the hinge. The clevis may include a rigid leg and a connecting pin extending laterally from the rigid leg. The connecting pin may be received within the arcuate seat. The rigid leg may extend upward above the apex relative to the vertical direction to cover the apex.

In another exemplary aspect of the present disclosure, a dishwashing appliance is provided. The dishwashing appliance may include a cabinet, a tub, a door, a hinge, a spring linkage, and a clevis. The cabinet may define a wash chamber for the receipt of articles for washing. The cabinet may include a pair of opposing sidewalls, a top wall, and a rear wall. The tub may be disposed inside the cabinet and define a front opening. The door may be rotatably positioned at the front opening and provide selective access to the wash chamber of the cabinet. The hinge may be rotationally fixed to the door. The hinge may define a top edge, a bottom edge, and an arched cutout extending upward from the bottom edge. The arched cutout may have an entrance defined at the bottom edge, an apex disposed above the entrance relative to a vertical direction, and an arcuate seat disposed below the apex relative to the vertical direction. The spring linkage may extend from a first end to a second end. The first end may be mounted to the cabinet. The clevis may be disposed at the second end of the spring linkage in selective attachment with the hinge. The clevis may include pair of rigid legs and a connecting pin extending laterally between the pair of rigid legs. The connecting pin may be received within the arcuate seat. Each rigid leg may extend upward above the apex relative to the vertical direction to cover the apex and sandwich the hinge between the pair of rigid legs.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
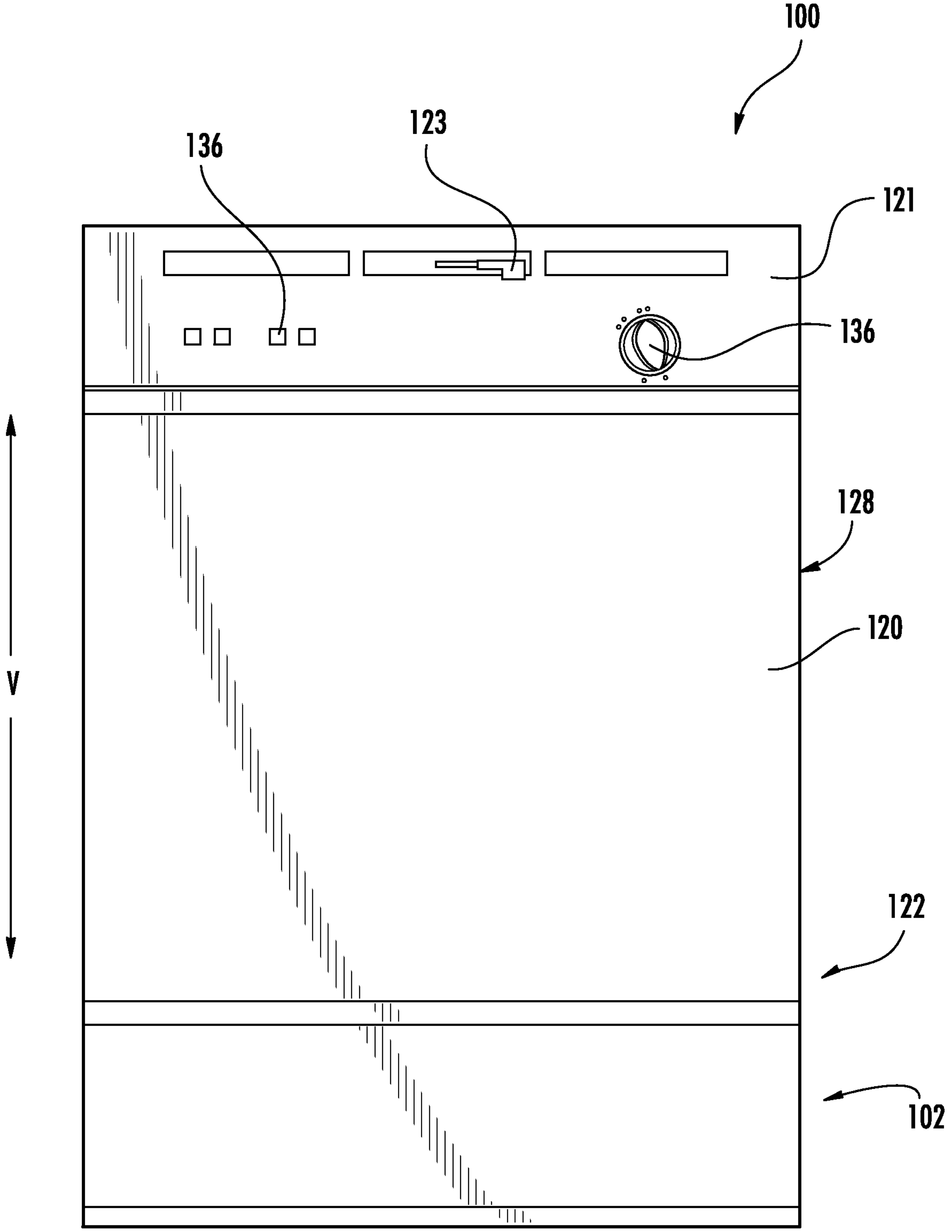
FIG. 1 provides a front view of a dishwashing appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "coupled," "fixed," "attached to," and the like refer to both direct coupling, fixing, or attaching, as well as indirect coupling, fixing, or attaching through one or more intermediate components or features, unless otherwise specified herein.

Figure 2:
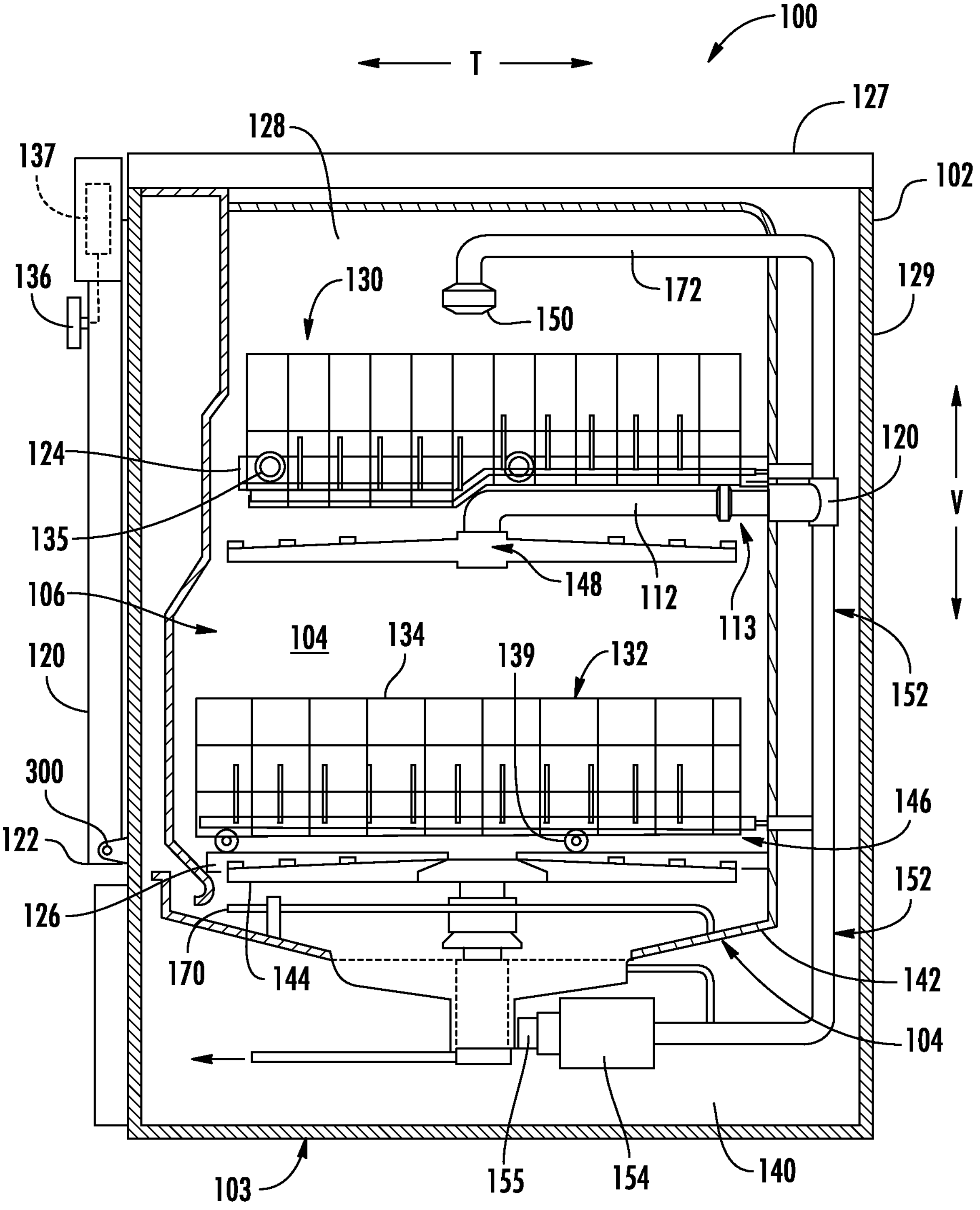
FIG. 2 proves a cross-sectional elevation view of the exemplary dishwashing appliance of FIG. 1.
Figure 3:
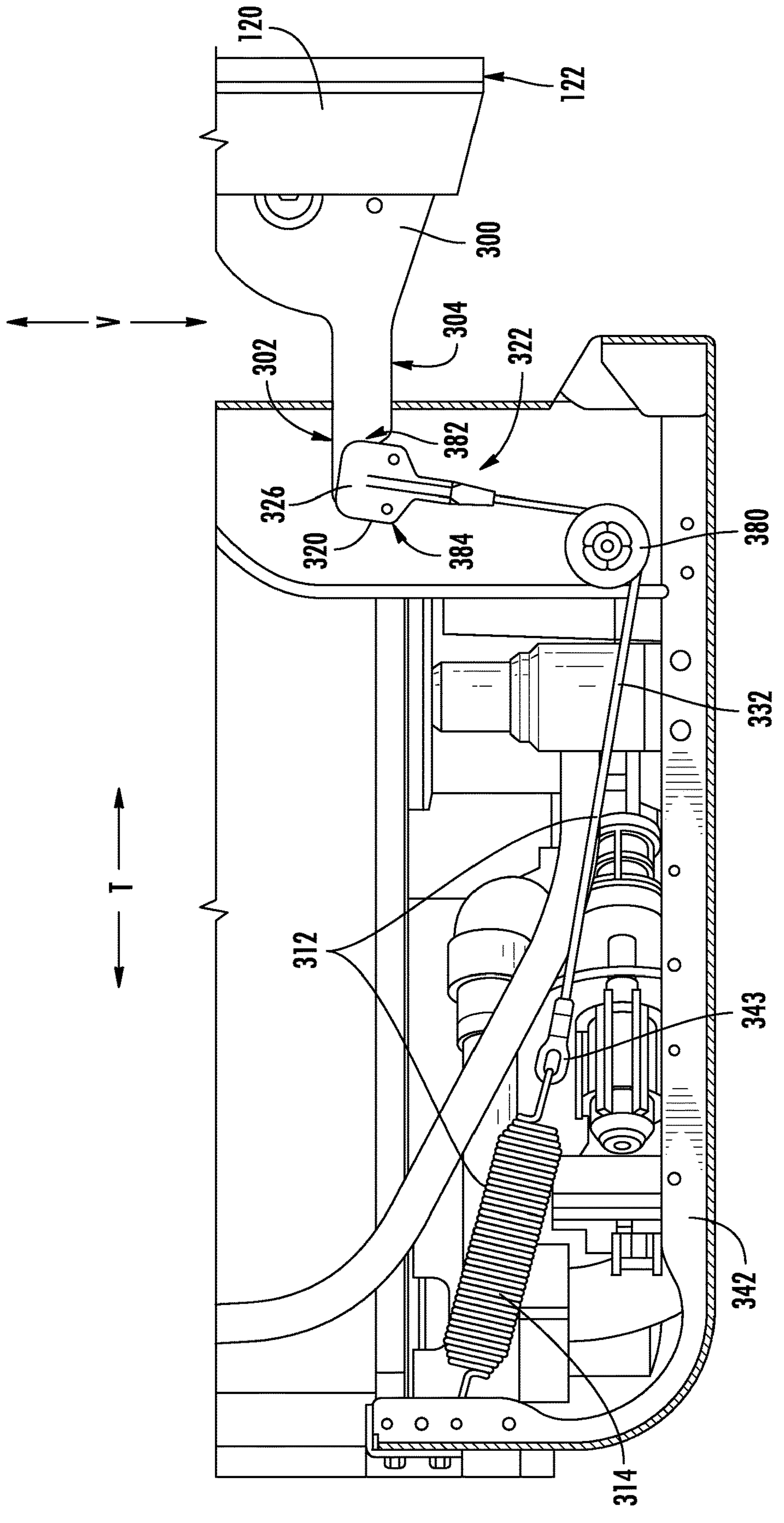
FIG. 3 is a side elevation view of a balance assembly in an appliance according to exemplary embodiments of the present disclosure.
Figure 4:
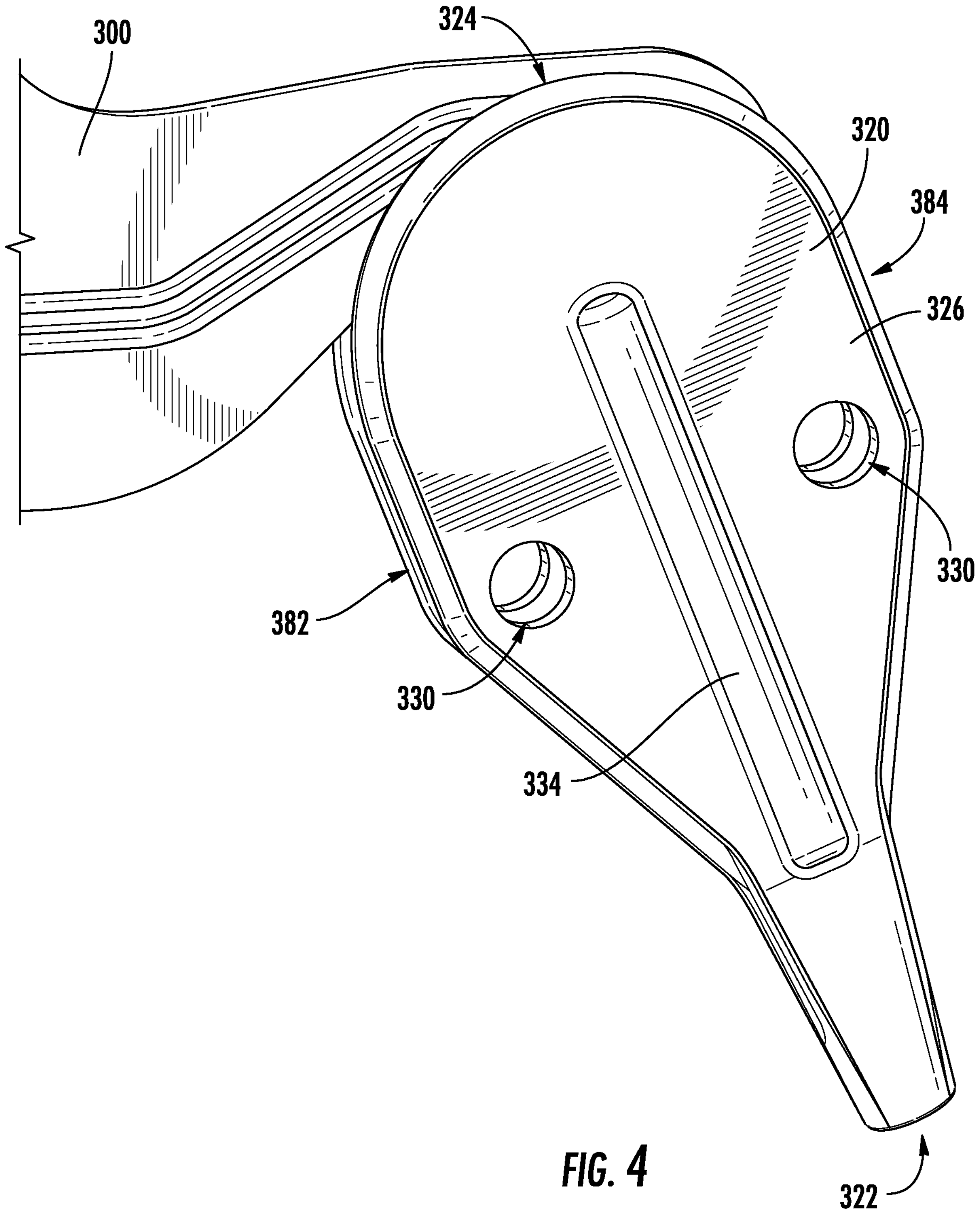
FIG. 4 provides a perspective view of a clevis and hinge of the exemplary balance assembly of FIG. 3.
Figure 5:
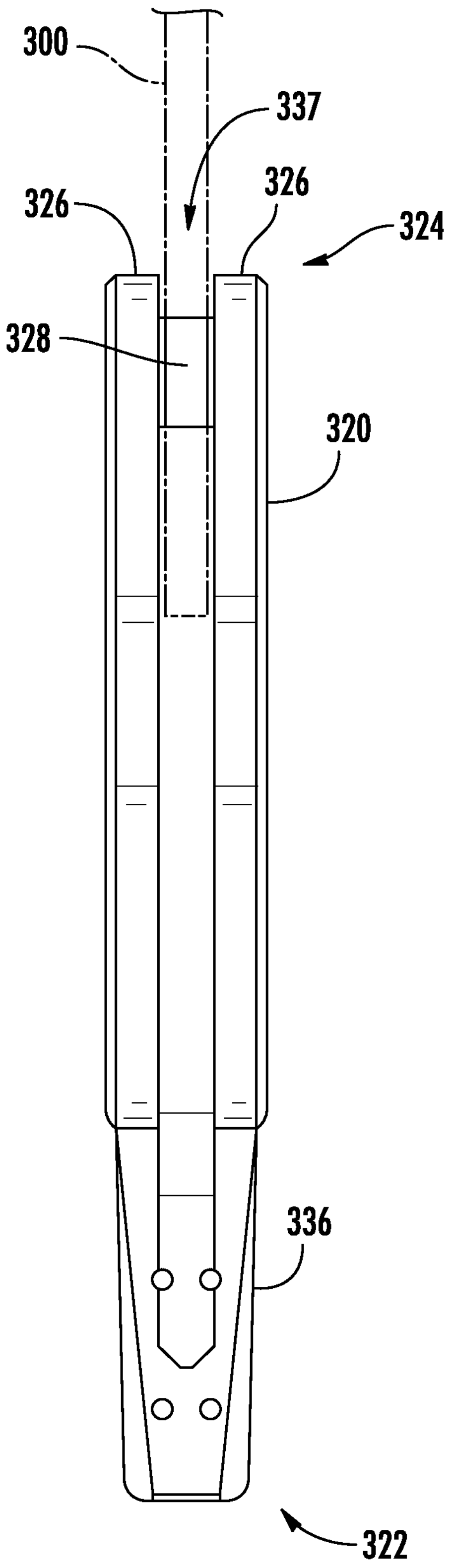
FIG. 5 provides a top plan view of a clevis of the exemplary balance assembly of FIG. 3.
Figure 6:
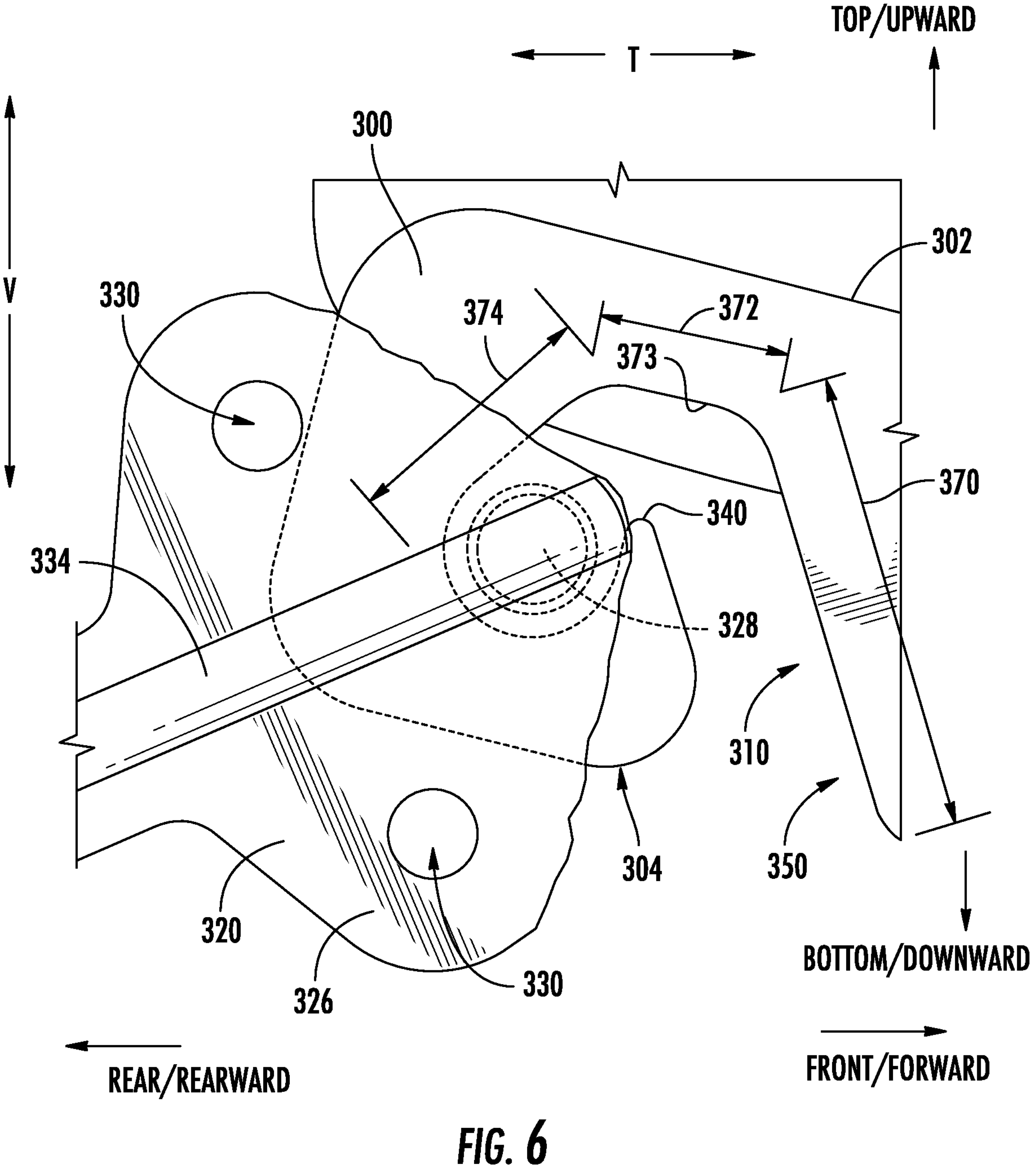
FIG. 6 provides a perspective view of a clevis and hinge of the exemplary balance assembly of FIG. 3, wherein a portion of the clevis has been removed for clarity.
Figure 7:
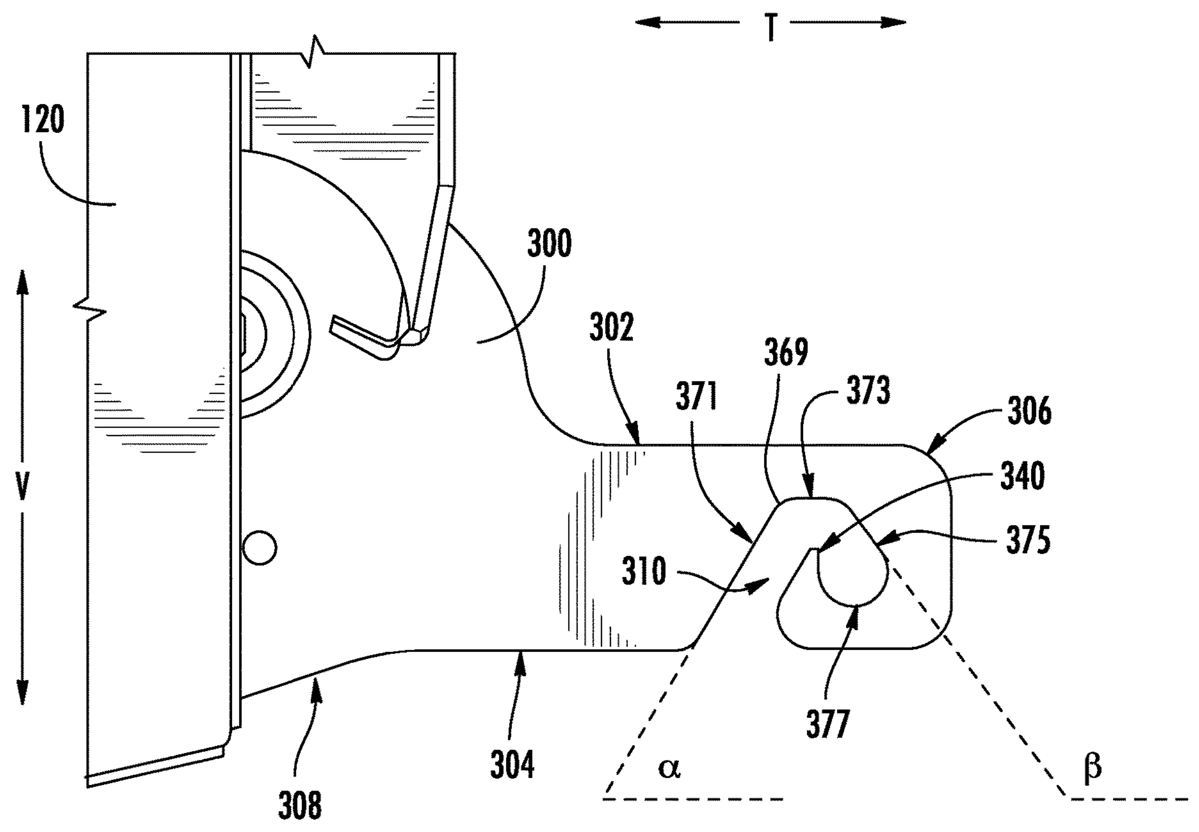
FIG. 7 provides a side elevation view of a hinge of the exemplary balance assembly of FIG. 3.

FIGS. 1 and 2 depict an exemplary domestic dishwasher 100 that may be configured in accordance with aspects of the present disclosure. Lateral direction L, transverse direction T, and vertical direction V are shown in the figures. For the particular embodiment of FIGS. 1 and 2, the dishwasher 100 includes a cabinet 102 having a tub 104 therein that defines a wash chamber 106. In this regard, as used herein, the terms "cabinet," "housing," and the like are generally intended to refer to an outer frame or support structure for appliance 100 (e.g., including any suitable number, type, and configuration of support structures formed from any suitable materials, such as a system of elongated support members, a plurality of interconnected panels, or some combination thereof). It should be appreciated that cabinet 102 does not necessarily require an enclosure and may simply include open structure supporting various elements of appliance 100. By contrast, cabinet 102 may enclose some or all portions of an interior of cabinet 102. It should be appreciated that cabinet 102 may have any suitable size, shape, and configuration while remaining within the scope of the present subject matter.

The tub 104 includes a front opening (not shown) and a door 120 hinged at its bottom 122 for movement between a normally closed vertical position (shown in FIGS. 1 and 2), wherein the wash chamber 106 is sealed shut for washing operations, and a horizontal open position for loading and unloading of articles from the dishwasher. Latch 156 is used to lock and unlock door 120 for access to wash chamber 106. The cabinet 102 includes a pair of opposing side walls 128, a top wall 127, and a rear wall 129. A tub 104 is disposed inside the cabinet 102 and configured with a front opening for receipt of a door 120 hinged at its bottom 122.

Upper and lower guide rails 124, 126 are mounted on tub side walls 128 and accommodate roller-equipped rack assemblies 130 and 132. Each of the rack assemblies 130, 132 is fabricated into lattice structures including a plurality of elongated members 134 (for clarity of illustration, not all elongated members making up assemblies 130 and 132 are shown in FIG. 2). Each rack 130, 132 is adapted for movement between an extended loading position (not shown), in which the rack is substantially positioned outside the wash chamber 106, and a retracted position (shown in FIGS. 1 and 2), in which the rack is located inside the wash chamber 106. This rack movement is facilitated by rollers 135 and 139, for example, mounted onto racks 130 and 132, respectively. A silverware basket (not shown) may be removably attached to rack assembly 132 for placement of silverware, utensils, and the like, that are otherwise too small to be accommodated by the racks 130, 132.

The dishwasher 100 further includes a lower spray-arm assembly 144 that is rotatably mounted within a lower region 146 of the wash chamber 106 and above a tub sump portion 142 so as to rotate in relatively close proximity to rack assembly 132. A mid-level spray-arm assembly 148 is located in an upper region of the wash chamber 106 and may be located in close proximity to upper rack 130. Additionally, an upper spray assembly 150 may be located above the upper rack 130. Although a spray assembly 150 is shown, an upper spray arm assembly may be used as well. Other fluid emitting devices for cleaning articles may be used at the lower, middle, and/or upper positions as well.

The lower and mid-level spray-arm assemblies 144, 148 and the upper spray assembly 150 are in fluid communication with a pump 154 and a main supply conduit 152 for circulating fluids (e.g., wash or rinse) in the tub 104. The main supply conduit 152 is served by a recirculation pump 154 positioned in a machinery compartment 140 located below the tub sump portion 142 (i.e., bottom wall) of the tub 104, as generally recognized in the art. Pump 154 receives fluid from sump 142 to provide a flow to the main supply conduit 152. A heating element 170 can be used to provide heat during e.g., a drying cycle.

Each spray-arm assembly 144, 148 includes an arrangement of discharge ports or orifices for directing washing fluid received from pump 154 onto dishes or other articles located in rack assemblies 130 and 132. The arrangement of the discharge ports in spray-arm assemblies 144, 148 provides a rotational force by virtue of washing fluid flowing through the discharge ports. The resultant rotation of the spray-arm assemblies 144, 148 and the operation of spray assembly 150 using fluid from pump 154 provides coverage of dishes and other dishwasher contents with a washing spray. Other configurations of spray assemblies may be used as well.

The middle spray-arm assembly 148 is releasably connected with fluid supply conduit 152 by way of a diverter 200 as further described herein. Specifically, as rack 130 is moved in and out of chamber 106, fluid supply conduit 112 releasably connects or disconnects from diverter 200. Other configurations may also be used.

The dishwasher 100 is further equipped with a controller 137 to regulate operation of the dishwasher 100. The controller may include one or more memory devices and one or more microprocessors, such as general or special purpose microprocessors operable to execute programming instructions or micro-control code associated with a cleaning cycle. The memory may represent random access memory such as DRAM or read only memory such as ROM or FLASH. In one embodiment, the processor executes programming instructions stored in memory. The memory may be a separate component from the processor or may be included onboard within the processor.

The controller 137 may be positioned in a variety of locations throughout dishwasher 100. In the illustrated embodiment, the controller 137 may be located within a control panel area 121 of door 120 as shown in FIGS. 1 and 2. In such an embodiment, input/output ("I/O") signals may be routed between the control system and various operational components of dishwasher 100 along wiring harnesses that may be routed through the bottom 122 of door 120. Typically, the controller 137 includes a user interface panel/controls 136 through which a user may select various operational features and modes and monitor progress of the dishwasher 100. In one embodiment, the user interface 136 may represent a general purpose I/O ("GPIO") device or functional block. In one embodiment, the user interface 136 may include input components, such as one or more of a variety of electrical, mechanical or electro-mechanical input devices including rotary dials, push buttons, and touch pads. The user interface 136 may include a display component, such as a digital or analog display device designed to provide operational feedback to a user. The user interface 136 may be in communication with the controller 137 via one or more signal lines or shared communication busses.

It should be appreciated that the invention is not limited to any particular style, model, or configuration of dishwasher. The exemplary embodiment depicted in FIGS. 1 and 2 is for illustrative purposes only. For example, different locations may be provided for user interface 136, different configurations may be provided for racks 130, 132, different spray devices and spray arm assemblies may be used, and other differences may be applied as well.

Turning now generally to FIGS. 3 through 10, various views are provided of a balance assembly to assist with opening or closing of door 120. As shown, and as will be described in greater detail below, balance assembly generally includes one or more hinges 300 on the door 120 to attach to one or more spring linkages 312. It is noted that although the hinges 300 generally rotate or move with the door 120 relative to the cabinet 102—and thus the vertical, lateral, and transverse directions V, L, and T defined by the cabinet 102—the positioning of various elements or portions of the balance assembly will be described with respect to the to the vertical, lateral, and transverse directions V, L, and T with the door 120 in the closed position, unless indicated otherwise.

In some embodiments, a pair of one-piece hinges 300 are disposed proximate the opposing side walls 128 of cabinet 102. Each hinge 300 defines a top edge 302, bottom edge 304, hinge distal end 306, and hinge proximal end 308. Optionally, the hinge proximal end 308 may be removably coupled to the door 120.

The hinge distal end 306 is spaced apart along transverse direction T from hinge proximal end 308. The hinge distal end 306 defines an arched cutout 310 extending vertically upward from the bottom edge 304 and terminating near the hinge distal end 306. As shown, especially in FIG. 7, for this exemplary embodiment, arched cutout 310 is defined by an edge 369 that includes a first section 371 at an angle $\alpha$ from transverse direction T, an adjacent second section forming a flattened top apex 373 that is parallel to transverse direction T, an adjacent third section 375, and an adjacent curved or arcuate seat 377 into which a connection pin 328 can be removably received. These sections provide a hook-like shape for cutout 310. A pin retention lip 340 projects upwardly along vertical direction V and is positioned adjacent to arcuate seat 377. In one exemplary embodiment, angle $\alpha$ may be, for example, in a range including 30 to 60 degrees and, in another exemplary embodiment, about 45 degrees. In one exemplary embodiment, angle $\beta$ may be, for example, in a range including 90 to 180 degrees and, in another exemplary embodiment, about 135 degrees.

Appliance 100 includes at least one spring linkage, shown as a pair of spring assemblies or spring linkages 312, positioned on each side 128 of cabinet 102. Only one side is shown in the current figures—it being understood the construction of each side is substantially similar. On each side of appliance 100, the spring linkage 312 has a clevis 320 removably coupled to the cutout 310 of the hinge 300.

For each side, the spring linkage 312 includes a cable 332 coupled to the clevis proximal end 322 using a conical cable mount 336. The conical cable mount 336 provides a hole of decreasing diameter to secure an end of cable 332. Spring linkage 312 includes a spring 314 removably coupled to a leg 326 of the dishwasher frame 342. A cable eyelet 343 is mounted to the cable 332 and coupled to the spring 314. Spring 314 applies tension to the cable 332, which in turn pulls on hinge 300 using clevis 320.

In some embodiments, a guide wheel 380 is rotatably mounted to cabinet 102. For instance, guide wheel 380 may be attached to cabinet 102 proximate to one of the pair of opposing sidewalls 128. When assembled, a portion of spring linkage 312 (e.g., cable 332) may be disposed along a portion of the circumference of guide wheel 380. Guide wheel 380 may thus engage a portion of spring linkage 312. Moreover, cable 332 may be directed beneath guide wheel 380 (e.g., such that a portion of cable 332 is disposed along a bottom portion of guide wheel 380). When spring linkage 312 is attached to door 120, cable 332 may be wound along circumference of guide wheel 380 from the bottom portion of guide wheel 380 upward along the vertical direction V toward hinge 300, which may be positioned above guide wheel 380. During use, guide wheel 380 may thus maintain tension on spring linkage 312 (e.g., as spring linkage 312 biases door 120 between the open position and the closed position).

As shown, the clevis 320 generally defines a clevis proximal end 322 and a clevis distal end 324. Generally, clevis includes at least one rigid leg 326 extending to the clevis distal end 324 (e.g., from the conical cable mount 336). A connecting pin 328 further extends from the rigid leg 326. Specifically, the connecting pin 328 extends laterally from the rigid leg 326. As shown, rigid leg 326 generally defines or spans a larger area across the vertical-transverse plane than connecting pin 328. As shown, when viewed in the vertical-transverse plane, rigid leg 326 completely covers or blocks the view of (or access to connecting pin 328 along the lateral direction L). When assembled, and as will be described in greater detail below, connecting pin 328 is selectively received within an arched cutout 310 defined by hinge 300.

In some embodiments, a pair of clevis legs 326 are positioned on opposing sides of the hinge 300 and form a slot 337 for receipt of hinge 300 (e.g., to sandwich hinge 300 between legs 326). Clevis legs 326 are positioned at clevis distal end 324 and extend from clevis distal end 324 towards the clevis proximal end 322. Each leg 326 of the clevis 320 may include a longitudinal rib 334 formed into the leg 326 for additional strength or to help guide a spring linkage removal tool (not shown) into position. For this exemplary embodiment, clevis 320 is symmetrical about rib 334.

In certain embodiments, the clevis connecting pin 328 is disposed between the pair of legs 326 at the clevis distal end 324 and within slot 337. Each clevis leg 326 has at least one tool bore (i.e., bore hole) 330 for complementary receipt of a linkage removal tool. For this exemplary embodiment, each clevis leg 326 includes a pair of tool bores 330 positioned in an opposing manner about rib 334 so as to provide a total of four tool bores 330.

The illustrated embodiments the hinge 300 with a pin retention lip 340 projecting towards the second section 373 for retaining the clevis connection pin 328 in an engaged position while the door 120 is opened and closed. The arched cutout 310 is oriented with the entrance on the bottom edge 304. The arched cutout 310 extends from the bottom edge 304 of the hinge 300 and may enable servicing from below without removing the dishwasher from the installed position (in-situ). When assembled, connecting pin 328 is received within arcuate seat 377. Thus, connecting pin 328 may be bounded (e.g., along the transverse direction T) between pin retention lip 340 and the distal end 306 of hinge 300. The pair of rigid legs 326 may bound the hinge 300 (e.g., along the lateral direction L).

Figure 8:
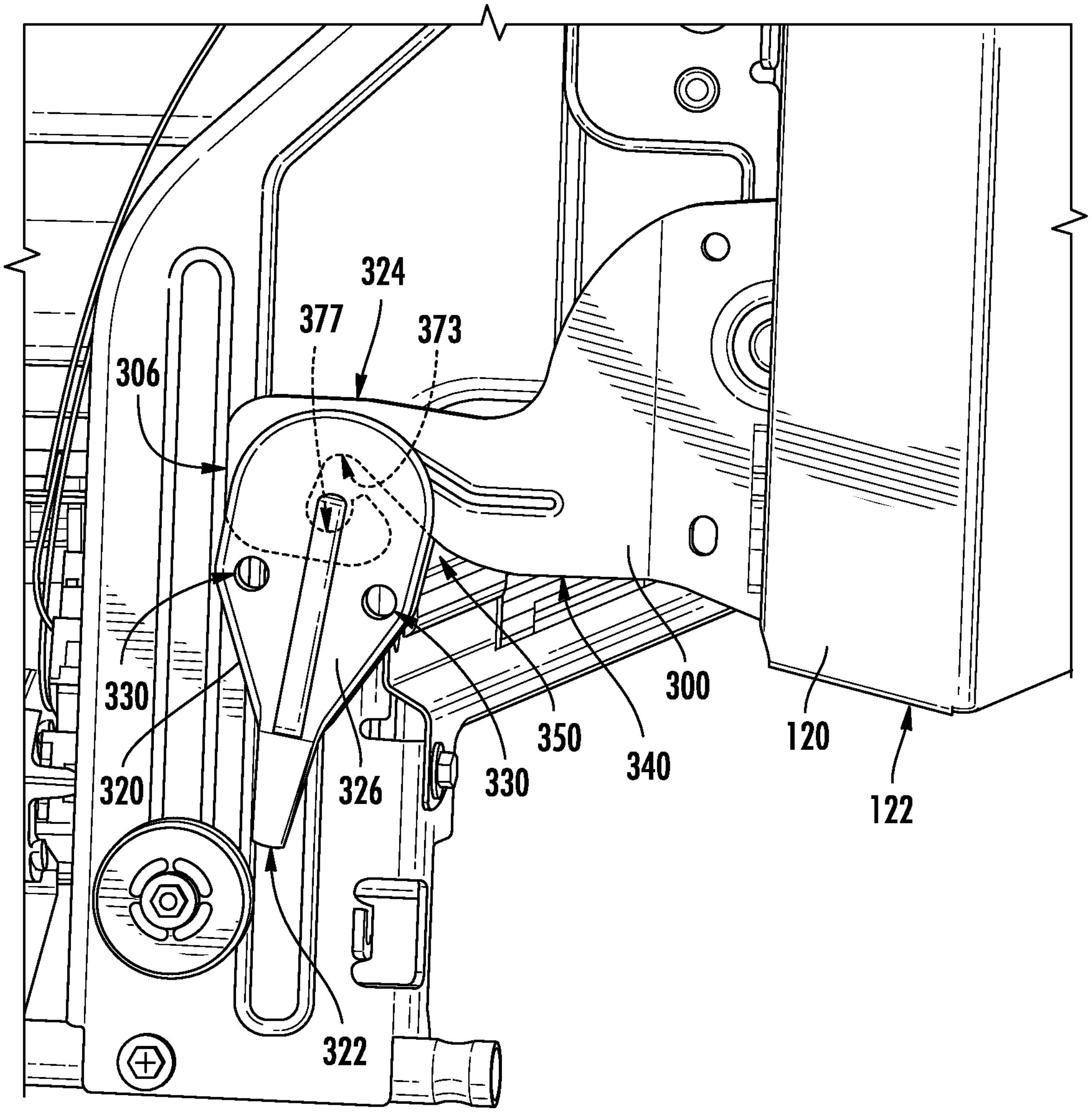
FIG. 8 provides a perspective view of a clevis and hinge of the exemplary balance assembly of FIG. 3, wherein the door is in a closed position.
Figure 9:
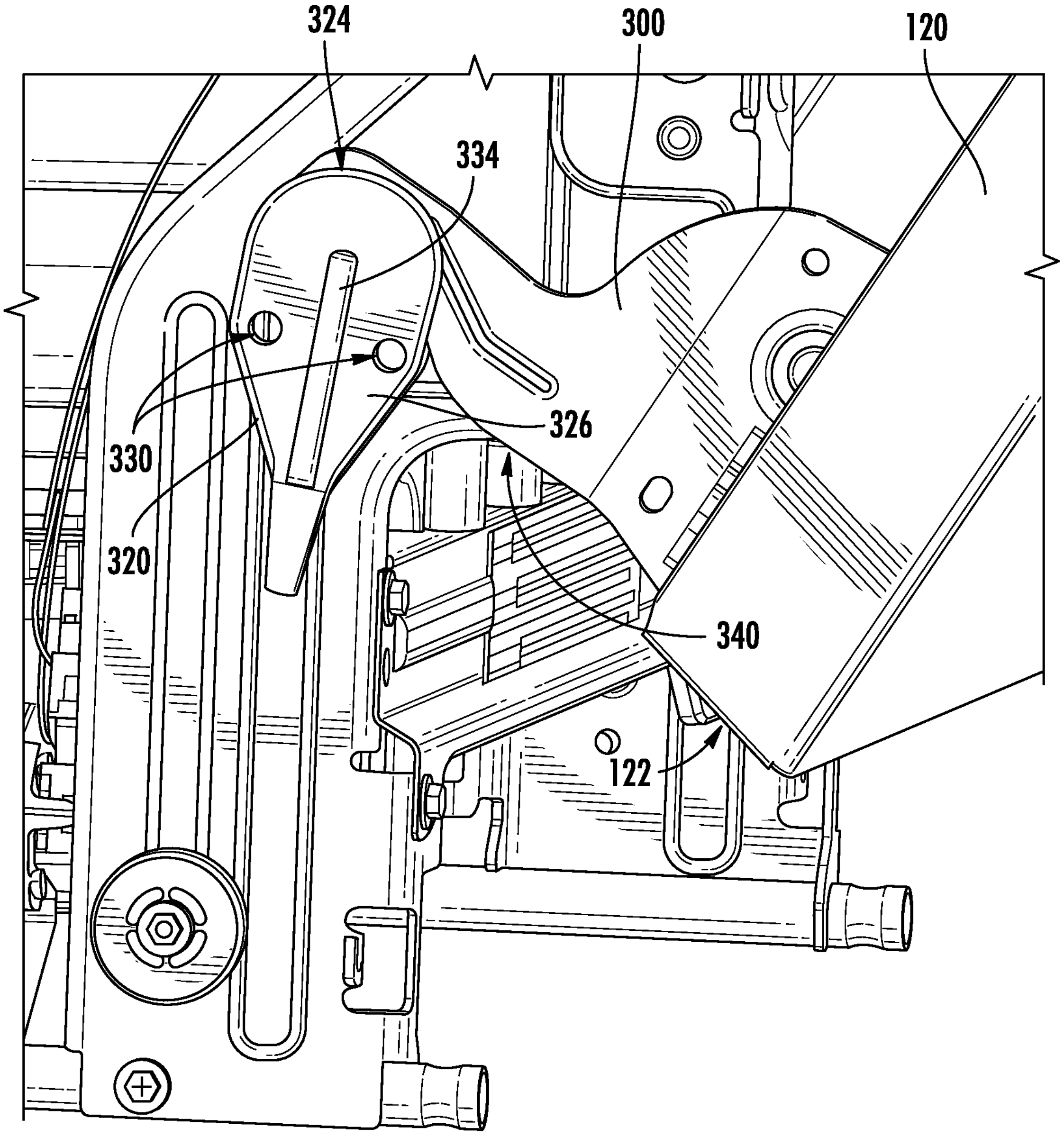
FIG. 9 provides a perspective view of a clevis and hinge of the exemplary balance assembly of FIG. 3, wherein the door is in an intermediate position.
Figure 10:
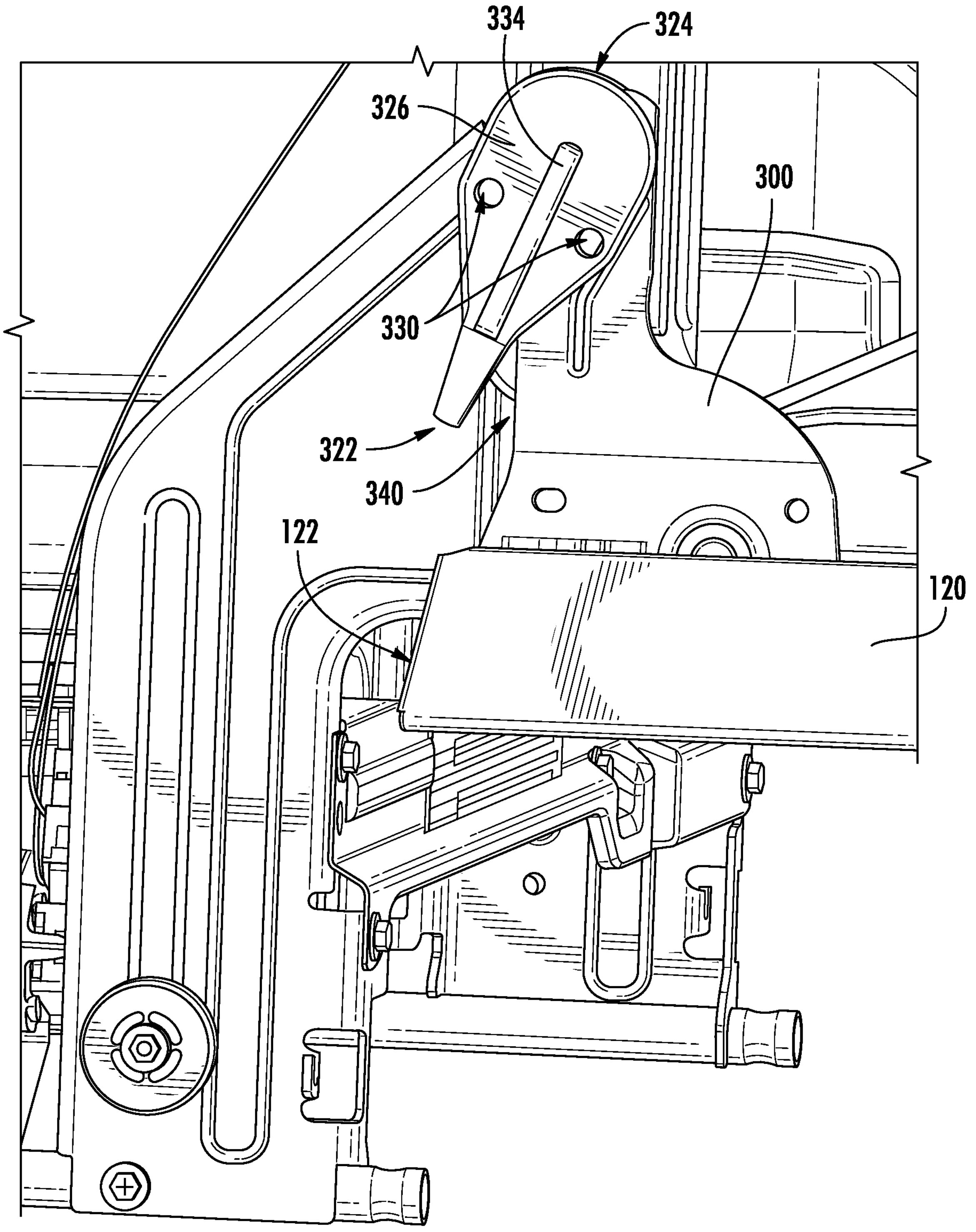
FIG. 10 provides a perspective view of a clevis and hinge of the exemplary balance assembly of FIG. 3, wherein the door is in an open position.

As shown, the rigid legs 326 extend past one or more sections of the arched cutout 310 (e.g., as viewed from the side of the appliance 100 or otherwise in the two-dimensional vertical-transverse plane). In particular, rigid leg 326 (e.g., one or both rigid legs 326) extends upward (e.g., from pin 328) relative to the vertical direction V to a point above apex 373 (e.g., while still being laterally offset from apex 373). Thus, the clevis distal end 344 is disposed at a higher vertical height than apex 373. Moreover, apex 373 is covered by rigid leg 326 (e.g., both in the closed and open positions, as well as one or more intermediate positions therebetween). Optionally, the perimeter of rigid leg 326 may define a curved radius. The curved radius of rigid leg 326 may be larger than that of connection pin 328 or any section of arched cutout 310. Optionally, the radius may be constant from the front end 382 of clevis 320 to the rear end 384 of clevis 320. Notably, rigid leg 326 (or clevis 320, generally) may be prevented from laterally crossing apex 373 or otherwise being tilted relative to hinge 300, even as door 120 rotates between the closed position and the open position (e.g., as illustrated by FIGS. 8 through 10).

Separate from or in addition to extending upward above the apex 373, rigid leg 326 (e.g., one or both rigid legs 326) may extend forward relative to the transverse direction T (e.g., towards door 120). In some such embodiments, rigid leg 326 extends forward (e.g., from pin 328) past hinge retention lip 340. All or some of retention lip 340 may be covered by rigid leg 326 (e.g., both in the closed and open positions, as well as one or more intermediate positions therebetween). In some embodiments, rigid leg 326 further extends forward past at least a portion of entrance 350. In turn, rigid leg 326 may further cover at least a portion of entrance 350 (e.g., both in the closed and open positions, as well as one or more intermediate positions therebetween). Notably, rigid leg 326 (or clevis 320, generally) may be prevented from laterally crossing retention lip 340 or entrance 350, or otherwise being tilted relative to hinge 300, even as door 120 rotates between the closed position and the open position (e.g., as illustrated by FIGS. 8 through 10).

Further additionally or alternatively, rigid leg 326 (e.g., one or both rigid legs 326) may extend rearward relative to the transverse direction T (e.g., towards tub 104). In some such embodiments, rigid leg 326 extends rearward (e.g., from pin 328) past the distal end 306 of hinge 300 (e.g., the distalmost point of hinge 300). Distal end 306 may be covered by rigid leg 326 (e.g., both in the closed and open positions, as well as one or more intermediate positions therebetween). Notably, rigid leg 326 (or clevis 320, generally) may be prevented from laterally crossing distal end 306 (or the portion of arched cutout 310 disposed between distal end 306 and connection pin 328 along the transverse direction T) or otherwise being tilted relative to hinge 300, even as door 120 rotates between the closed position and the open position (e.g., as illustrated by FIGS. 8 through 10).

A linkage removal tool (not shown) may gain access to the clevis 320 from the front of the dishwasher after removal of the dishwasher toekick panel. Specific features of the arched cutout 310, as shown in FIG. 8, enable front access in-situ removal of the spring linkage 312 from the door hinges 300 thereby allowing in-situ removal of the door. An enlarged entrance 350 at the bottom edge 304 of the hinge 300, a flattened top apex 373 positioned near the top edge 302, and a hinge retention lip 340 allow sufficient space for the clevis connecting pin 328 to easily travel in and out of the arched cutout 310 while also retaining the clevis 320 engaged with the hinge 300 during opening and closing of the door 120.

In optional embodiments, the arched cutout 310 is formed such that the clevis connecting pin 328 moves in three linked travel paths for engagement and disengagement with the hinge 300. The first path 370 starts at the enlarged entrance 350 and extends upward in the first angle α direction toward the rear wall 129. The second path 372 extends in a generally traverse direction sufficient distance such that the clevis connecting pin 328 clears the pin retention lip 340. The third path 374 extends downward along second angle β direction toward the rear wall 129. These linked travel paths provide serviceable geometry to retain the clevis pin 328 connection with the hinge 300 during normal door 120 operation while also allowing a linkage removal tool (not shown) to disengage the clevis 320 from the hinge 300 for in-situ door 120 removal. As shown, these three paths may be at non-zero angles to each other.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dishwashing appliance defining a mutually-orthogonal vertical direction, lateral direction, and transverse direction, the dishwashing appliance comprising:

a cabinet defining a wash chamber for the receipt of articles for washing, the cabinet comprising a pair of opposing sidewalls, a top wall, and a rear wall;

a tub disposed inside the cabinet and defining a front opening;

a door rotatably positioned at the front opening and providing selective access to the wash chamber of the cabinet;

a hinge rotationally fixed to the door, the hinge defining a top edge, a bottom edge, and an arched cutout extending upward from the bottom edge, the arched cutout having an entrance defined at the bottom edge, an apex disposed above the entrance relative to the vertical direction, and an arcuate seat disposed below the apex relative to the vertical direction;

a spring linkage extending from a first end to a second end, the first end being mounted to the cabinet; and a clevis disposed at the second end of the spring linkage in selective attachment with the hinge, the clevis comprising a rigid leg and a connecting pin extending laterally from the rigid leg, the connecting pin being received within the arcuate seat, and the rigid leg extending upward above the apex relative to the vertical direction to cover the apex, wherein the hinge further defines a hinge retention lip disposed between the entrance and the arcuate seat relative to the transverse direction, and wherein the rigid leg further extends forward from the connection pin and covers the hinge retention lip as the door rotates between an open position and a closed position.

2. The dishwashing appliance of claim 1, wherein the rigid leg defines a bore hole to receive a linkage removal tool.

3. The dishwashing appliance of claim 1, wherein the rigid leg is a first rigid leg, wherein the clevis comprises a second rigid leg parallel to the first rigid leg, and wherein connecting pin extends laterally between the first and second rigid legs.

4. The dishwashing appliance of claim 3, wherein each rigid leg defines a discrete bore hole configured to receive a linkage removal tool.

5. The dishwashing appliance of claim 3, wherein the hinge is held between the first and second rigid legs along the lateral direction.

6. The dishwashing appliance of claim 1, wherein the rigid leg further extends forward from the connection pin and covers at least a portion of the entrance.

7. The dishwashing appliance of claim 1, wherein the hinge extends along the transverse direction between a hinge distal end and a hinge proximal end, the hinge proximal end being coupled to the door, and wherein the rigid leg further extends rearward from the connection pin.

8. The dishwashing appliance of claim 1, the dishwashing appliance further comprising a guide wheel rotatably mounted to the cabinet, wherein the spring linkage is disposed along a bottom portion of the guide wheel.

9. A dishwashing appliance defining a mutually-orthogonal vertical direction, lateral direction, and transverse direction, the dishwashing appliance comprising:

a cabinet defining a wash chamber for the receipt of articles for washing, the cabinet comprising a pair of opposing sidewalls, a top wall, and a rear wall;

a tub disposed inside the cabinet and defining a front opening;

a door rotatably positioned at the front opening and providing selective access to the wash chamber of the cabinet;

a hinge rotationally fixed to the door, the hinge defining a top edge, a bottom edge, and an arched cutout extending upward from the bottom edge, the arched cutout having an entrance defined at the bottom edge, an apex disposed above the entrance relative to the vertical direction, and an arcuate seat disposed below the apex relative to the vertical direction;

a spring linkage extending from a first end to a second end, the first end being mounted to the cabinet; and a clevis disposed at the second end of the spring linkage in selective attachment with the hinge, the clevis comprising a pair of rigid legs and a connecting pin extending laterally between the pair of rigid legs, the connecting pin being received within the arcuate seat, and each rigid leg extending upward above the apex relative to the vertical direction to cover the apex and sandwich the hinge between the pair of rigid legs, wherein the hinge further defines a hinge retention lip disposed between the entrance and the arcuate seat relative to the transverse direction, and wherein the pair of rigid legs further extends forward from the connection pin and covers the hinge retention lip on opposite lateral sides as the door rotates between an open position and a closed position.

10. The dishwashing appliance of claim 9, wherein the pair of rigid legs comprises a first rigid leg and a second rigid leg parallel to the first rigid leg, and wherein connecting pin extends laterally between the first and second rigid legs and orthogonal thereto.

11. The dishwashing appliance of claim 9, wherein at least one rigid leg of the pair of rigid legs defines a bore hole configured to receive a linkage removal tool.

12. The dishwashing appliance of claim 9, wherein each rigid leg defines a pair of discrete bore holes on opposite ends of a longitudinal rib to receive a linkage removal tool.

13. The dishwashing appliance of claim 9, wherein the pair of rigid legs further extend forward from the connection pin and cover at least a portion of the entrance.

14. The dishwashing appliance of claim 9, wherein the hinge extends along the transverse direction between a hinge distal end and a hinge proximal end, the hinge proximal end being coupled to the door, and wherein the pair of rigid legs further extend rearward from the connection pin.

15. The dishwashing appliance of claim 9, the dishwashing appliance further comprising a guide wheel rotatably mounted to the cabinet, wherein the spring linkage is disposed along a bottom portion of the guide wheel.

16. A dishwashing appliance defining a mutually-orthogonal vertical direction, lateral direction, and transverse direction, the dishwashing appliance comprising:

a cabinet defining a wash chamber for the receipt of articles for washing, the cabinet comprising a pair of opposing sidewalls, a top wall, and a rear wall;

a tub disposed inside the cabinet and defining a front opening;

a door rotatably positioned at the front opening and providing selective access to the wash chamber of the cabinet;

a hinge rotationally fixed to the door and extending along the transverse direction between a hinge distal end and a hinge proximal end coupled to the door, the hinge defining a top edge, a bottom edge, and an arched cutout extending upward from the bottom edge, the arched cutout having an entrance defined at the bottom edge, an apex disposed above the entrance relative to the vertical direction, and an arcuate seat disposed below the apex relative to the vertical direction;

a spring linkage extending from a first end to a second end, the first end being mounted to the cabinet; and a clevis disposed at the second end of the spring linkage in selective attachment with the hinge, the clevis comprising a pair of rigid legs and a connecting pin extending laterally between the pair of rigid legs, the connecting pin being received within the arcuate seat, and each rigid leg extending upward above the apex relative to the vertical direction to cover the apex and sandwich the hinge between the pair of rigid legs to prevent lateral tilting of the clevis relative to the apex as the door rotates between an open position and a closed position, wherein the hinge further defines a hinge retention lip disposed between the entrance and the arcuate seat relative to the transverse direction, wherein the pair of rigid legs further extends forward from the connection pin and covers the hinge retention lip and at least a portion of the entrance to prevent lateral tilting of the clevis relative to the hinge retention lip as the door rotates between the open position and the closed position, and wherein the pair of rigid legs further extend rearward from the connection pin and covers the hinge distal end to prevent lateral tilting of the clevis relative to the hinge distal end as the door rotates between the open position and the closed position.

17. The dishwashing appliance of claim 16, wherein the pair of rigid legs comprises a first rigid leg and a second rigid leg parallel to the first rigid leg, and wherein connecting pin extends laterally between the first and second rigid legs and orthogonal thereto.

18. The dishwashing appliance of claim 16, wherein at least one rigid leg of the pair of rigid legs defines a bore hole configured to receive a linkage removal tool.

19. The dishwashing appliance of claim 16, wherein each rigid leg defines a pair of discrete bore holes on opposite ends of a longitudinal rib to receive a linkage removal tool.

20. The dishwashing appliance of claim 16, the dishwashing appliance further comprising a guide wheel rotatably mounted to the cabinet, wherein the spring linkage is disposed along a bottom portion of the guide wheel.

* * * * *